(12) United States Patent
Brant et al.

(10) Patent No.: US 6,629,158 B1
(45) Date of Patent: Sep. 30, 2003

(54) SYSTEM, APPARATUS, AND METHOD FOR CONFIGURING AN ARRAY CONTROLLER

(75) Inventors: William A. Brant, Boulder, CO (US); Walter A. Hubis, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,485

(22) Filed: Feb. 16, 2000

(51) Int. Cl.[7] .............................................. G06F 13/00
(52) U.S. Cl. ............................ 710/10; 710/10; 710/15; 710/16; 710/17; 710/18; 710/19; 710/104; 711/114; 711/170
(58) Field of Search ............................. 710/10, 15, 16, 710/17, 18, 19, 104; 711/114, 170

(56) References Cited

U.S. PATENT DOCUMENTS

| | | | | |
|---|---|---|---|---|
| 5,822,782 A | * | 10/1998 | Humlicek et al. | 711/170 |
| 6,098,119 A | * | 8/2000 | Surugucchi et al. | 710/10 |
| 6,347,359 B1 | * | 2/2002 | Smith et al. | 711/114 |
| 6,389,495 B1 | * | 5/2002 | Larkey et al. | 710/129 |

* cited by examiner

*Primary Examiner*—Jeffrey Gaffin
*Assistant Examiner*—Mohammad O. Farooq
(74) *Attorney, Agent, or Firm*—Brian G. Hart; Arthur J. Samodovitz (57) ABSTRACT

One embodiment of the present invention provides a procedure to configure the operation of the a device controller. In particular, the procedure operates in a system that includes a controller that is connected across a first input/output (I/O) interface to at least one other controlled device. An auxiliary computer is connected to the controller by a second I/O interface. The auxiliary computer has a processor therein for executing a set of computer program instructions stored in a first memory. The computer program instructions cause the auxiliary computer to first identify a set of resources in the system. Next, the auxiliary computer determines a set of compatible configuration options that are compatible with the identified resources. Next, the auxiliary computer generates an executable procedure from a number of software procedures that are stored in the memory of the auxiliary computer to implement the compatible configuration options. Finally, the auxiliary computer communicates the executable procedure into a second memory of the controller as controller configuration code.

16 Claims, 5 Drawing Sheets

SYSTEM, APPARATUS, AND METHOD FOR CONFIGURING AN ARRAY CONTROLLER

FIELD OF THE INVENTION

The present invention relates to data storage systems. In particular, the present invention relates to a system, structure and procedure for customizing an array controller's operating software before downloading the operating software onto the array controller.

BACKGROUND OF THE INVENTION

Disk drives in all computer systems are susceptible to failures caused by temperature variations, head crashes, motor failure, controller failure, and changing voltage conditions. Modern computer systems typically require, or at least benefit from, a fault-tolerant data storage system, for protecting data in the data storage system against any instances of disk drive failure. One approach to meeting this need is to provide a Redundant Array of Independent Disks (RAID).

RAID is a known data storage technology. A typical RAID system includes a disk array controller (controller) coupled across both an input/output (I/O) bus to multiple disk storage devices (known as a disk array), and coupled across another I/O bus to the one or more host computers. The controller processes I/O requests from the one or more host computers to the disk array. Such I/O requests include, for example, Small Computer System Interface (SCSI) I/O requests, which are known in the art.

To configure a RAID system, an end-user will first typically determine how may units of storage, or respective storage subsystems are needed to realize one or more purposes of the RAID system. For example, the purpose of a first storage subsystem may be used to increase the capacity of a general-purpose file and print server. The purpose of a second storage subsystem may be used to support a database application that has to keep running 24 hours a day. The purpose of a third storage subsystem may be used to playback on demand large files of audio or video clips. And, the purpose of a fourth storage subsystem may be used to store image data for an imaging system.

Next, an end-user will typically organize the disk storage devices into a number of storage subsystems necessary to meet the determined purpose(s) of the RAID system, where, if there is more than one such storage subsystem, each storage subsystem may have a different storage capacity as compared to the storage capacity of another storage subsystem. For each storage subsystem, depending upon the determined purpose of each respective storage subsystem, the end user will select a particular RAID technology for the controller to manage the I/O between the one or more host computers and each respective storage subsystem. The particular RAID technology selected to manage a storage subsystem may provide, among other things, a level of reliability to the storage system in the event of one or more disk storage device failures, and compliance with any access parameters necessary to implement the respective storage subsystems's purpose. (Certain RAID technologies do not provide data redundancy).

A controller will use one or more different RAID technologies, or RAID levels 0–5, to stripe, or divide data from a host computer into data segments and distribute the data segments across the disk storage devices in a storage subsystem in a well-defined manner. As a result of data striping, the disk storage devices that make up a data storage subsystem become, in effect, one logical storage unit as far as a host computer is concerned. The numerical RAID levels 0–5 refer to different data striping techniques that balance various levels of storage subsystem capacity, data availability and I/O performance. Thus, depending on the particular RAID level selected by an end-user to manage the one or more storage subsystems, a controller will use a different access profile, or technique with respect to how it will manage the type and frequency of I/O activity that is performed against the disk storage devices in the storage subsystem over the course of time.

To facilitate the configuration and maintenance of a RAID system, a controller typically includes a RAID system configuration architecture that is stored on a hardware device (non-volatile RAM or firmware) that includes computer instructions (configuration code) and data. Such a configuration architecture typically supports all possible RAID system configurations that an end user may require. Because such an open ended configuration architecture must implement all possible combinations of RAID system configurations, the accompanying configuration code is generally very complex involves large amounts of code. Such complex configuration code presents a number of significant problems.

For example, one problem with such complex code is that is very difficult and time consuming to modify, because there is no prior art that allows an end user or computer programmer to modify such code without sophisticated computer programming tools. If the configuration code resides in read only firmware, it cannot be modified at all. Another problem with such complex configuration code is difficult to maintain. This is because field upgrades, that is upgrading the configuration code in a controller to benefit from another version of the configuration code, are impractical when the controller has already been distributed to an end-user.

Another problem with such complex configuration code is that it is difficult to comprehensively test both for errors in programming logic and for potential errors that may result from illegal end user input parameters. To ensure that the configuration code is properly designed, the logic for each possible hardware, RAID level, and end user input combination should be tested, which is a time consuming and highly specialized process.

To appreciate the typical testing process, consider that the number of configurations to test is equal to "$k^n$", where "k" is equal to the number of choices you have for each option, and "n" is equal to the number of different configuration options. For example, consider a data storage system where only eight (8) devices, for example, 8 virtual disk storage devices, need to be configured and wherein each device has up to five (5) different configuration options, for example 5 RAID levels. In such a system, the number of configurations to test is equal to $5^8$ ("$k^n$"), or 390,625 possible configurations to test. Because, a typical data storage subsystem has more than eight different devices, and often more than one-hundred (100) different devices that may be configured, it can be appreciated that testing such complex code a time consuming and highly specialized process.

Another problem with such complex configuration code is that it degrades controller I/O processing performance. Controller I/O processing performance is related to the number of processor clock cycles that are required for a processor in the controller to execute an instruction. Because the configuration code is traditionally open ended and flexible, it must necessarily make many real-time decisions as to how the data is going to be accessed, retrieved, and/or stored across a RAID system. Each of these decisions are generally implemented in the configuration code with conditional statements. Because conditional statements typically require more processor clock cycles to execute as compared to other types of statements, these many run-time decisions degrade controller I/O processing performance.

Yet another problem with such complex configuration code is that it has a large code footprint, meaning that a large amount of memory resources are respectively required to store and execute configuration code that includes logic for all possible RAID system configurations. Because large amounts of memory are expensive, it is desirable to keep such memory requirements to a minimum.

What is needed is a system, apparatus and procedure for an end user to conveniently customize and download the configuration code in a controller's configuration architecture to reflect the end-users desired RAID system configuration. It is desirable for such a customized configuration architecture to not include logic to support all possible RAID data storage system configurations. As a result, the customized configuration architecture will be simpler, as compared to traditional configuration code, to modify, maintain, and test.

Desirably, the customized controller configuration architecture will increase a controller's I/O performance as compared to typical controller I/O performance, because it will not include conditional logic to computer instructions that support configurations that do not apply to the end users desired system configuration. Desirably, reduced number of computer programmed instructions in the customized controller architecture will reduce the amount of memory that is required for a controller to respectively store and execute the configuration code, as compared to the amount of such memory that a controller typically requires to store and execute such code.

SUMMARY OF THE INVENTION

The present invention provides a procedure to configure the operation of the a device controller. In particular, the procedure operates in a system that includes a controller that is connected across a first input/output (I/O) interface to at least one other controlled device. In one embodiment, an auxiliary computer is connected to the controller by a second I/O interface. The auxiliary computer has a processor therein for executing a set of computer program instructions stored in a first memory. The computer program instructions cause the auxiliary computer to first identify a set of resources in the system. Next, the auxiliary computer determines a set of compatible configuration options that are compatible with the identified resources. Next, the auxiliary computer generates an executable procedure from a number of software procedures that are stored in the memory of the auxiliary computer to implement the compatible configuration options. Finally, the auxiliary computer communicates the executable procedure into a second memory of the controller as controller configuration code.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF EMBODIMENTS OF THE INVENTION

Figure 1:
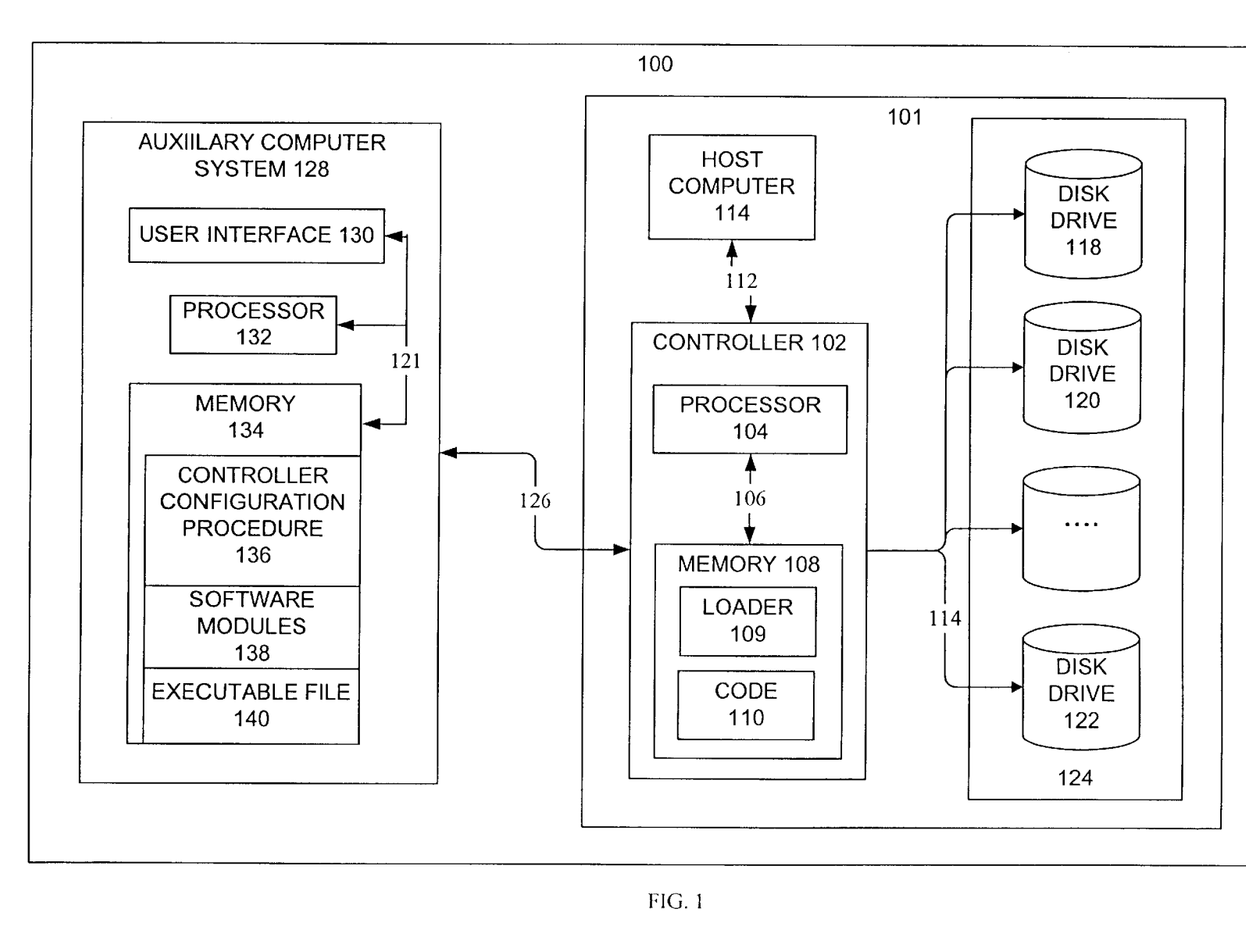
FIG. 1 is a block diagram illustrating aspects of an exemplary system, according to one embodiment of the present invention.

FIG. 1 is a block diagram that illustrates an exemplary system 100 according to one embodiment of the present invention. System 100 includes data storage system 101 which includes host computer 114 coupled across front-end interface 112 to controller 102. Controller 102 is coupled across back-end interface 114 to data storage subsystem 124. Data storage system 124 includes a number of disk storage devices, such as, for example, disk drives 118–122. Auxiliary computer system 128 is connected to data storage system 101 across auxiliary interface 126 which is coupled to controller 102.

Controller 102 includes processor 104, which is coupled across local bus 106 to memory 108. Memory 108 includes any combination of storage that is internal or external to processor 104 that is addressable by processor 104. For example, memory 134 can be internal cache memory, external random access memory (RAM), external Flash RAM, or external virtual memory on a data storage device 118–122 where virtual addresses are mapped by processor 104 into real addresses. In a preferred embodiment, memory 108 is a combination of RAM and Flash RAM.

Processor 104 fetches, decodes and executes programmed instructions stored memory 108. Such programmed instructions include loader 109, to allow controller 102 to communicate with auxiliary computer 128 across auxiliary interface 126 to download executable file 140 to configuration file 110. Such communication is accomplished according to one or more known communication protocols, including, for example, RS-232, or SCSI command protocols.

After loader controller 102 downloads configuration code 110 to memory 108, processor 104 fetches, decodes and executes programmed instructions stored in configuration code 110 to manage I/O requests between host computer 114 and data storage subsystem 124. In contrast to conventional controller configuration code architectures which, as discussed above, have significant problems because they are architecturally open ended, configuration code 110 includes only that computer program logic that reflect the present configuration of data storage system 101. Procedures for customizing configuration code 110 to reflect the present configuration of data storage system 101 are described in greater detail below in reference to FIGS. 2–3.

Front end interface 112, back end interface 114, auxiliary interface 126 and local bus 106 can be any peripheral bus, including but not limited to a Peripheral Component Interconnect (PCI) bus, Industry Standard Architecture (ISA) bus, Extended Industry Standard Architecture (EISA) bus, Micro Channel Architecture, SCSI bus, Fibre Channel loop, Universal Serial Bus (USB), and the like.

Although FIG. 1 illustrates only one data storage subsystem 124 in data storage system 101, it is understood in the art that in data storage system 101 can include any number of data storage subsystems 124 (the number of storage subsystems 124 only being limited by the number of storage devices 118–122 and the number of data storage subsystems 124 that an end user creates while initially configuring the data storage system 101). In a preferred embodiment, data storage system 101 is operated as a RAID system, wherein host computer 114 sends I/O data requests to controller 102 which, in response to receiving such requests, distributes or retrieves the data respectively to or from data storage subsystem 124 according to a particular RAID level.

Auxiliary computer system 128 includes processor 132 which is coupled to memory 134 and user interface 130. Memory 134 includes any combination of storage that is internal or external to processor 132 that is addressable by processor 132. For example, memory 134 can be internal cache memory, external random access memory (RAM), or external virtual memory on a hard disk drive (not shown) where virtual addresses are mapped by processor 132 into real addresses. User interface 130 includes, for example, a keyboard (not shown) and a pointing device (not shown) for user input, and a display device (not shown), for displaying a textual or graphical user interface. An example of such a user interface is provided by the Microsoft Windows 98® operating system. In a preferred embodiment, auxiliary computer system 128 is a personal computer, for example, a portable laptop computer.

Memory 134 includes controller configuration procedure 136, software modules 138 and executable file 140. Controller configuration procedure 136 is a set of programmed instructions that are fetched, decoded and executed by processor 132. As will be described in greater detail below in reference to FIGS. 2–3, controller configuration procedure 136, in response to end user input, assembles, or links at least a subset of software modules 138 to create executable file 140. Besides containing links to one or more software modules 138, executable file 140 will also include machine executable code, or object code to perform basic controller 102 system functions, including, for example, memory management, hardware initialization routines, inter-controller communication functions, and the like.

Figure 2:
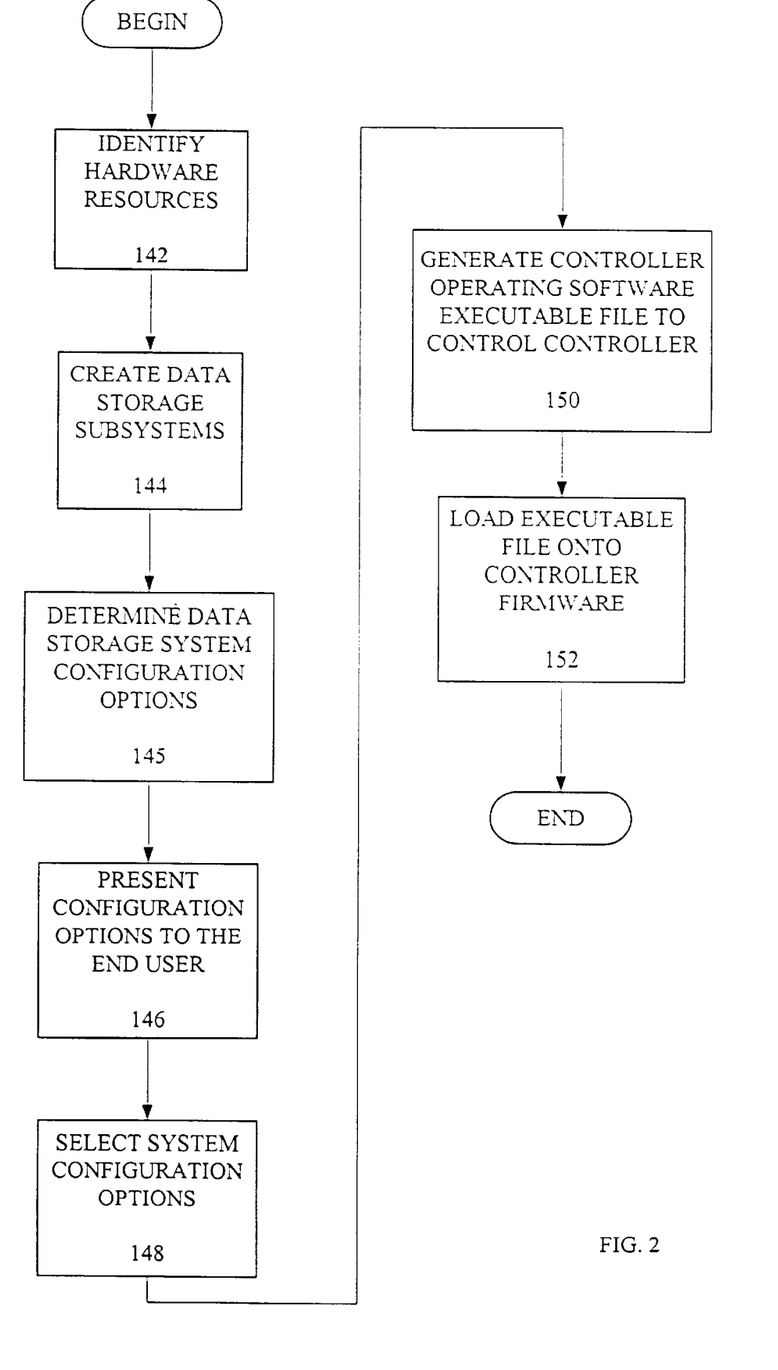
FIG. 2 is a flow chart illustrating aspects of an exemplary procedure to configure a controller's configuration architecture, according to one embodiment of the present invention.

Referring to FIG. 2, there is shown a flowchart illustrating aspects of an exemplary procedure used by controller configuration procedure 136 to customize configuration code 110 to include only that computer program logic that reflects the end user's selected data storage system 101 configuration. To accomplish this, step 142 uses a known protocol, for example, the SCSI identify command, to gather information concerning the particular hardware configuration of data storage system 101. Such information includes, for example, the numbers of controllers 102 and disk storage devices 118–122 in data storage system 101.

Such information also includes the type of front end interface 112, the type of back end interface 114, and the type and number of data storage devices 118–122. Recall that front end interface 112, the type of back end interface 114 can be any peripheral bus, including but not limited to a Peripheral Component Interconnect (PCI) bus, Industry Standard Architecture (ISA) bus, Extended Industry Standard Architecture (EISA) bus, Micro Channel Architecture, SCSI bus, Fibre Channel loop, Universal Serial Bus (USB), and the like. Because there may be more than one host computer 114, there may be more than one front end interface 112 and back end interface 114 connected to any one controller 102.

Step 144 queries the end user via user interface 130 to create a number of data storage subsystems 124, or logical disk drives from the array of physical disk storage devices 118–122 that were identified in step 142. During this step 142, the end user will associate a defined size, or storage capacity with each data storage subsystem 124.

Next, step 145 analyzes the information acquired in steps 142 and step 144 to determine the configuration options that apply to data storage system 101. These configuration options include at least a subset of all of the valid data storage system 101 configuration options that an end user could select to configure the data management operations of data storage system 101.

There are a number of valid configuration options that are considered. For example, for a particular RAID level to be a valid configuration option with respect to a data storage subsystem 124 (see FIG. 1), each of its respective hardware requirements must be met. The particular RAID level may require that an even or an odd number of physical disk storage devices 118–122 (see FIG. 1) are available to controller 102. Additionally, certain RAID levels support data redundancy and require a certain amount of storage space to implement this redundancy aspect. If these requirements are met with respect to a particular RAID level, then the particular RAID level will be a valid configuration option for data storage system 101. If these requirements are not met with respect to a particular RAID level, then the particular RAID level will not be a valid configuration option for data storage system 101.

In yet another example of data storage system 101 configuration options, consider that data storage devices 118–122 may fail for any one of a number of known reasons. An end user may require a "spare" data storage device 118–122 to replace a failed data storage device 118–122 to protect the integrity of a data storage system 101 in the event that a data storage device 118–122 fails. If such spare is available, depending on the valid RAID levels that can be supported by a data storage subsystem 124, then the use of a spare will be a valid configuration option. If such spare is not available, depending on the valid RAID levels that can be supported by a data storage subsystem 124, then the use of a spare will not be a valid configuration option.

Step 146 presents the valid configuration options (step 145) to the end user via user interface 130 (see FIG. 1). (Those data storage subsystem 101 configuration options that are determined not to apply to data storage system 101 are not presented to the end user). Step 148, selects, by the end user, a particular RAID level from the presented configuration options (step 146) to associate with each respective disk storage subsystem 124. For example, an end user may select RAID level 2 techniques to manage data I/O to a first data storage subsystem 124, and the end user may select RAID level 5 techniques to manage data I/O to a second data storage subsystem 124.

Step 150 assembles, or links at least a subset of software modules 138 (see FIG. 1) to executable file 140 (see FIG. 1), such that executable file 140 includes links to logic that will manage data storage system 101 according to the end user's particular configuration option selections (step 148). These links are resolved at link-time by processor 132. Procedures for performing such linking and resolving such links are known in the art of computer programming. Aspects of exemplary software modules 138 are described in greater detail below in reference to FIG. 3.

Step 152 downloads, by controller configuration procedure 136 (see FIG. 1) in combination with loader 109, executable file 140 to configuration code 110 in memory 108.

The procedure, system and apparatus of the present invention provides a number of substantial benefits to the end user as compared to the typical open ended controller configuration architectures. For example, the procedure (see FIG. 2, steps 142–152) provides a convenient way for an end user to modify the controller's 102 configuration code 110 to reflect the end-users desired RAID system configuration. To modify the configuration code 110, the end user simply selects desired data storage system 101 configuration options (step 148) that are different than the options that may be used in the current configuration code 110. These end user selected options are subsequently used to generate executable file 140 (step 150) which is then downloaded to controller 102 (step 152) to replace the current controller code 110. Therefore, this is a substantial benefit as compared to the read only configuration architectures provided in a traditional controller.

Another benefit of the procedure, system and apparatus of the present invention is that it is simple, as compared to the traditional read only controller configuration architectures, to allow an end user to easily maintain, or upgrade a controller's 102 configuration code 110. Each software module 152–156 encapsulates functions and data that pertain to specific functionality and tasks that controller 102 may use to manage data storage system 101. (Software modules 138 are discussed in greater detail below in reference to FIG. 3). Any one or more software modules can be modified to incorporate for example, more efficient algorithms (which in turn may result in a more compact code sizes), or additional RAID levels.

These upgrades can be delivered to an end user in any one of a number of ways, such as, for example, by providing the end user with a world wide web site on the internet from where new software modules may be downloaded onto the end users auxiliary computer system 128 (see FIG. 1). Next, using the procedures described above, the end user can incorporate such an upgraded software module 138 into the controller's 102 configuration code.

Another benefit of the procedures, system and apparatus of the present invention as compared to traditional controller configuration architectures is that the configuration code 110 (see FIG. 1) can be easily tested for errors. Controller configuration procedure 136 creates executable file 140 (see FIG. 1, and FIG. 2, step 150) which is customized to reflect the end-user's desired RAID system configuration. Executable file 140 is not as open ended and complex as the programming logic that is provided with a traditional controller. A computer programmer, using any one of a number of commercially available debuggers and techniques known in the art of computer programming, can locate, analyze and correct suspected faults with executable code 140 before it is downloaded into configuration code 110 (see FIG. 2, step 152). Such a debugger is, for example, is provided with Microsoft's Visual C++® computer program development environment.

Other benefits of the present invention as compared to the state of the art are related to the fact that the procedure of the present invention allows an end user to streamline configuration code 110 (see FIG. 1) to include only that logic which is relevant to the end-user's desired RAID system configuration. One benefit of such streamlined configuration code 110 is that, given the same set of end user selected options (see FIG. 2, step 148), the present invention will always result in increased controller 102 performance as compared to the performance of traditional controllers. This is because only a subset of the decisions that are determined in a traditional open ended controller configuration architecture will typically need to be resolved. Another benefit of such streamlined configuration code 110 is that it will typically reduce the amount of memory 108 that is required for a controller 102 to respectively store and execute any configuration code 110, as compared to the amount of memory that a traditional controller will requires to store and execute traditional configuration code.

Figure 3:
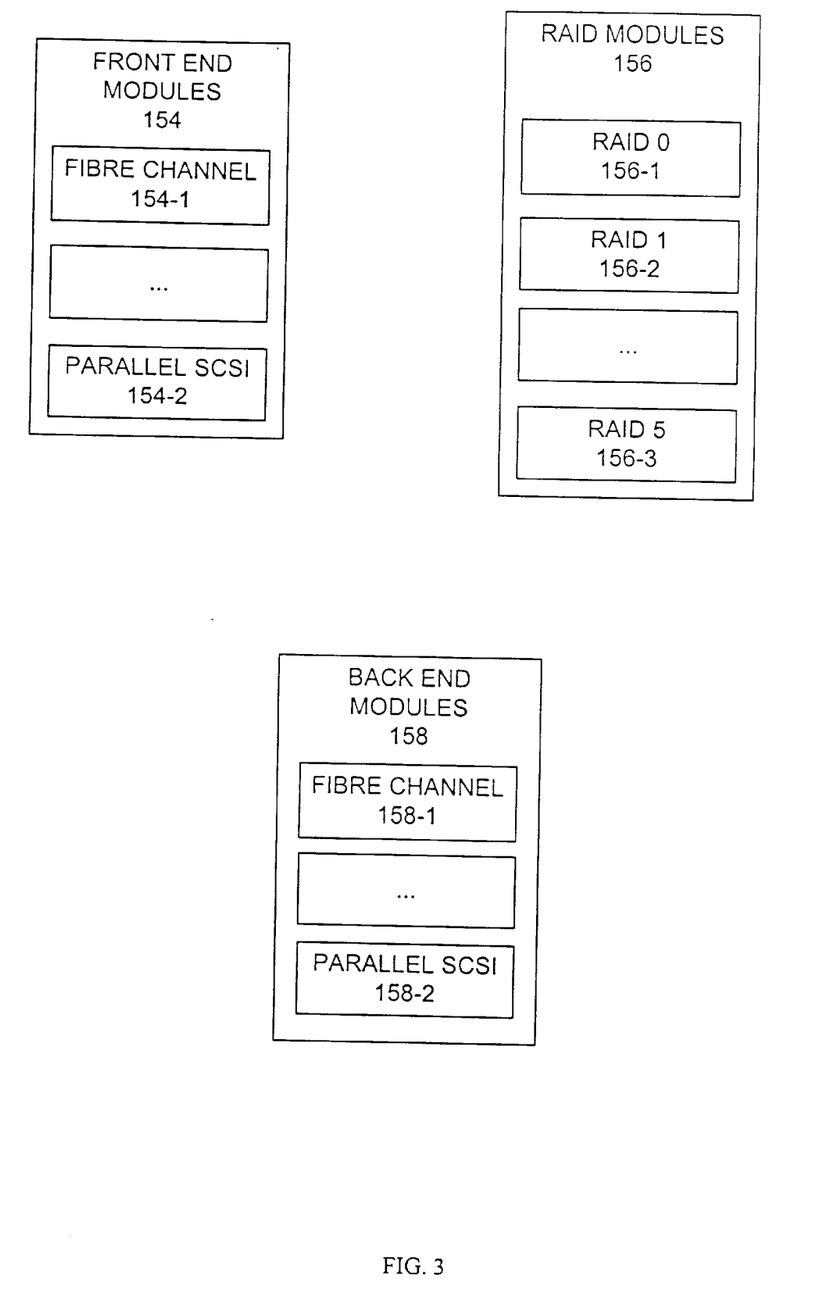
FIG. 3 is block diagram illustrating aspects of an exemplary set of software modules, according to one embodiment of the present invention.

Referring to FIG. 3, there is shown a block diagram illustrating aspects of an exemplary set of software modules 154–158 according to one embodiment of the present invention. Software modules 154–158 include, for example, front end modules 154, RAID level modules 156, and back end modules 158. Each software module 154–158 includes machine code, or computer instructions and data definitions that can be executed by processor 104. It can be appreciated that there are a number of different front end modules 154, RAID modules 156 and back end modules 158, there may be more or fewer of each, depending on the particular software module 154–158 implementation or on the hardware architecture of data storage system 101.

Front-end modules 148 include function and task specific support for each respective front end interface bus 112 (see FIG. 1) that is coupled to controller 102. For example, a first host computer 114 may be coupled to controller 102 with a fiber channel bus 112, therefore front end module 154 will include fibre channel module 154-1. In combination with the first host computer 114, a second host computer 114 may be coupled to controller 102 with across a SCSI bus 112, therefore front end module 154 will include parallel channel SCSI module 154-2, and the like.

RAID modules 156 include function and task specific support to manage each respective data storage subsystem 124 according to the particular RAID level that the end user has associated with each respective data storage subsystem 124 (see FIG. 2, step 148). For example, RAID level 0 may have been selected by the end user to manage a first data storage subsystem 124, therefore, RAID modules 156 includes RAID 0 module 156-1. Additionally, RAID level I may have been selected by the end user to manage a second data storage subsystem 124, therefore, RAID modules 156 includes RAID 1 module 156-2, and the like. RAID modules 156 includes a respective RAID module 156-1-170 for each respective data storage subsystem 124.

Back-end modules 158 include function and task specific support for each respective back end interface 114 (see FIG. 1) that is coupled to controller 102. For example, a first data storage subsystem 124 may be coupled to controller 102 with a fiber channel bus 114, therefore back end modules 158 will include fibre channel module 158-1. In combination with the first data storage subsystem 124, a second data storage subsystem 124 may be coupled to controller 102 with across a SCSI bus 114, therefore back end module 158 will include parallel channel SCSI module 158-2, and the like.

As noted above, in one embodiment software modules 154–158 are implemented as dynamic link libraries which may include a combination of runtime support code that ends up in the executable file 140 (see FIG. 1). Use of dynamic link libraries to bypass the traditional step of copying large amounts of code and data into an executable file during computer program code compilation and link steps is known.

Figure 4:
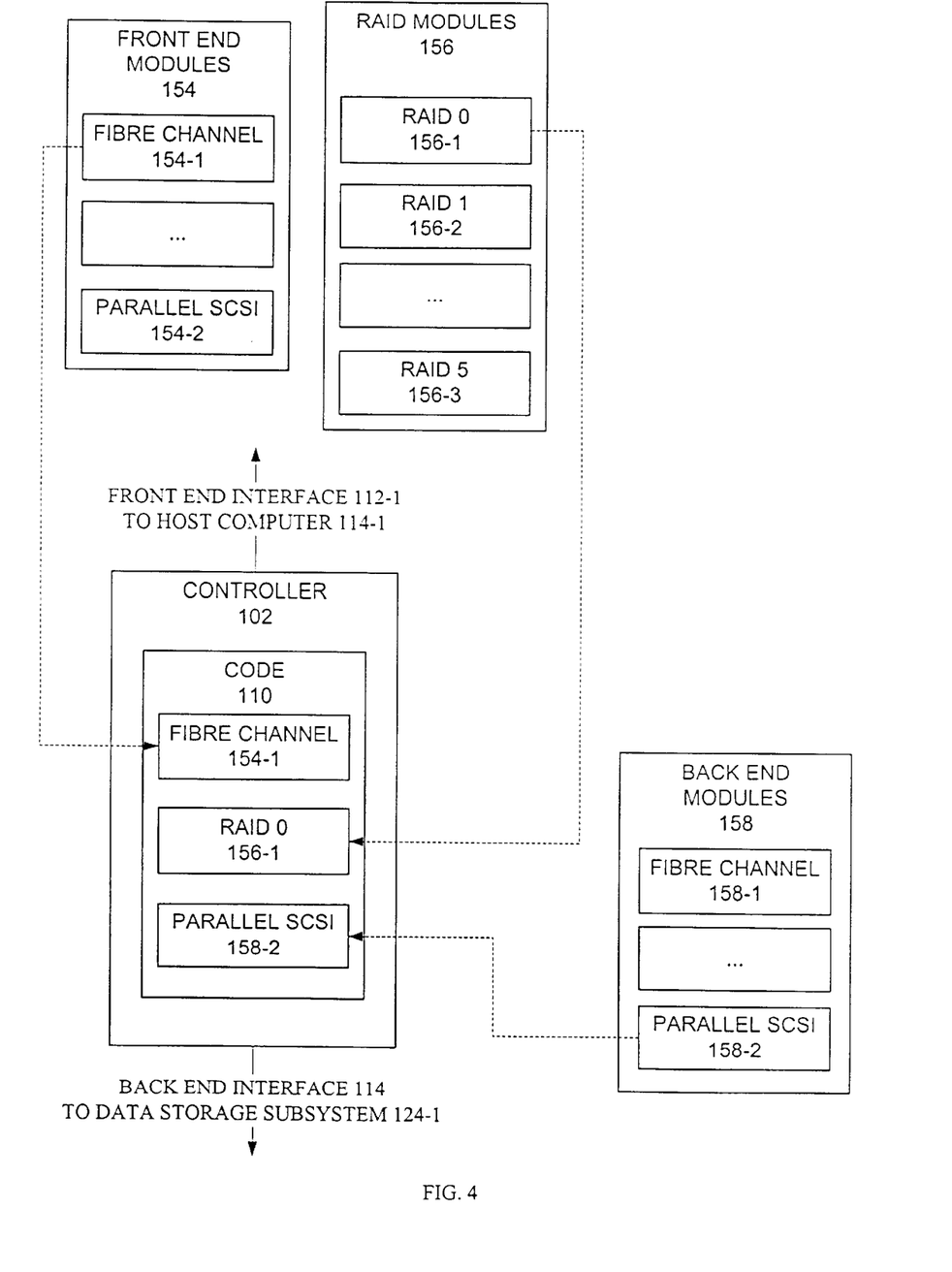
FIG. 4 is block diagram illustrating aspects of an exemplary assembled controller configuration code, according to one embodiment of the present invention; and, FIG. 5 is block diagram illustrating aspects of an exemplary assembled controller configuration code, according to one embodiment of the present invention.

FIG. 4 is a block diagram illustrating aspects of an exemplary assembled configuration code 110 (see FIG. 1), according to one embodiment of the present invention. In this example, there is only one host computer 114 and only one data storage subsystem 124. Configuration code 110 includes Fibre channel module 154-1 as a front-end module 154, a RAID 0 module 156-1 as the RAID module 156, and a parallel SCSI module 158-2 as a back-end module 158. As described above in reference to FIG. 2, step 148, to configure the architecture of executable file 140 (see FIG. 1) which is subsequently downloaded to configuration code 110 (see FIG. 2, step 152), the end user will select only one front end module 154, one RAID module 156, and one back end module 158 to manage the I/O for each data storage subsystem 124.

In yet another embodiment, controller 102 (see FIG. 1) has either, or a combination of more than one type of front end interface 112 and/or more than one type of back end interface 114. In this embodiment, at step 148 (see FIG. 2), to configure the architecture of executable file 140 (see FIG. 1), the end user will select either, or a combination of more than one front end module 154, and/or more than one back end module 158 to manage the I/O for a data storage subsystem 124.

Figure 5:
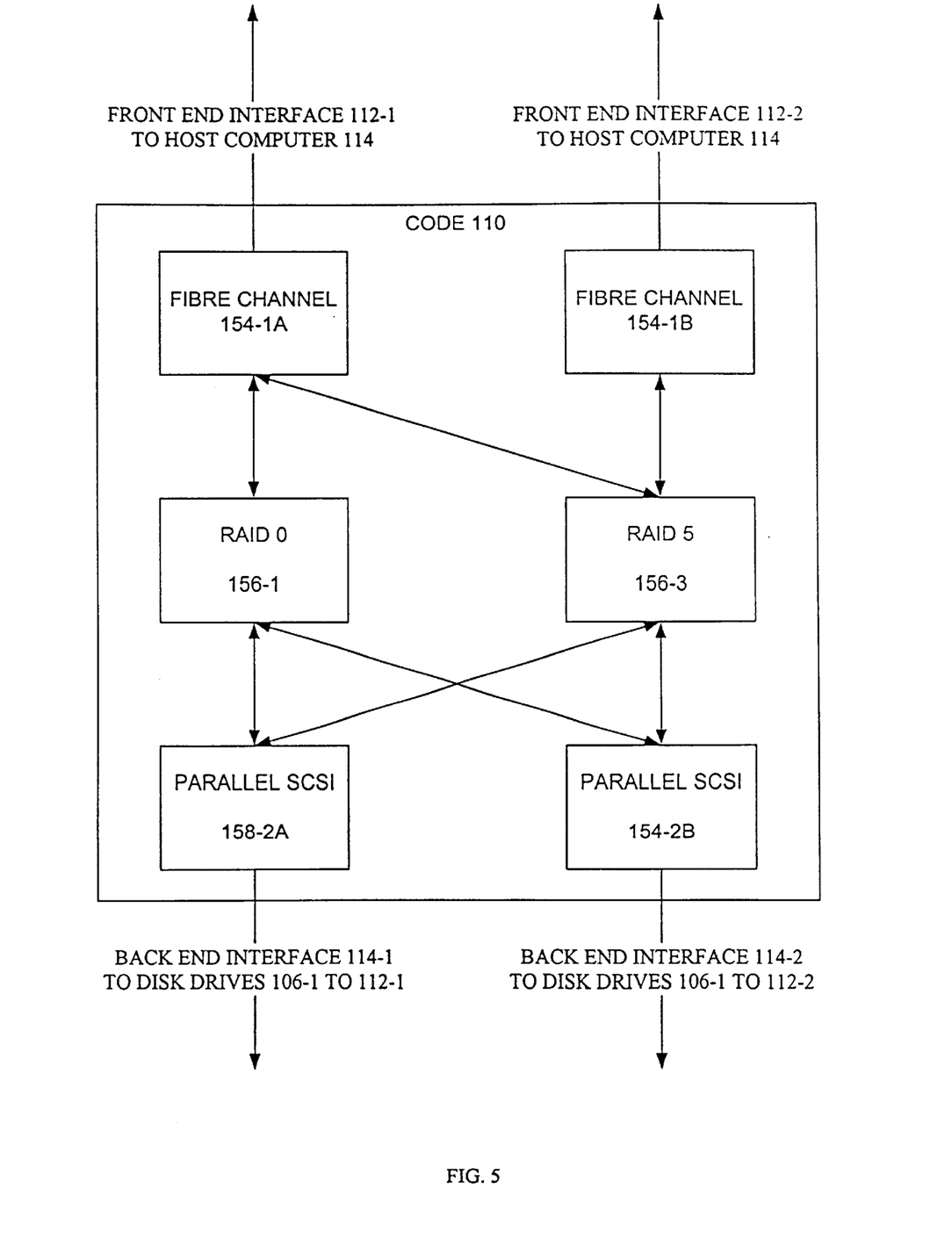

FIG. 5 is a block diagram illustrating aspects of an exemplary assembled configuration code 110 (see FIG. 1), according to yet another embodiment of the present invention. In this example, there is one host computer 114 and two data storage subsystems 124. Host computer 114 is coupled to controller 102 across a first front end interface 112-1 and a second front end interface 112-2. Controller 102 is loaded with controller operating software in the form of a configuration code 110. Configuration code 110 incorporates the following software modules 154–158 (see FIG. 3): two front-end modules 154 (front end module 154-1A and front end module 154-1B) that support a front end fibre channel interface; two RAID modules 156 (RAID 0 module 156-1 and RAID 5 module 156-3); and two back-end modules 158 (parallel SCSI modules 158-2A and (parallel SCSI modules 158-2B) that support a back end parallel SCSI interface. First back-end interface 114-1 is coupled to data storage subsystem 124-1 and second back-end interface 114-2 is coupled to data storage subsystem 124-2.

The particular configuration selected by the end user (see FIG. 2, step 148) for configuration code 110 links first front-end interface module 154-1A to both RAID 0 module 156-1 and RAID 5 module 156-3. Second front end interface module 154-1B is linked only to RAID 5 module 156-3. Each RAID, Module 156-1 and 156-3 has access to both data storage subsystems 124-1 and 124-2 via respective links to parallel SCSI interface modules 158-2A and 158-2B. Each data storage subsystem 124 is configured on a respective separate parallel SCSI channel, the first back-end interface 114-1 and the second back-end interface 114-2. Thus, configuration code 110 provides host computer 114: (a) access across first front end interface 112-1 to both data storage subsystems 124-1 and 124-2 using both RAID level 0 techniques and RAID level 5 techniques; and, (b) access across second front end interface 112-2 to both data storage subsystems 124-1 and 124-2 using only RAID level 5 techniques.

The foregoing descriptions of specific embodiments of the present invention have been presented for purposed of illustration and description. They are not intended to be exhaustive or to limit the invention to the precise forms disclosed, and obviously many modifications and variations are possible in light of the above teaching. For example, in yet another embodiment of the present invention, system 100 (see FIG. 1) does not include auxiliary computer system 128, but rather, host computer 118 performs the procedures (see FIG. 2, steps 142–152) of auxiliary computer system 128 to customize the configuration code 110 to include only that logic that reflects the end user's selected data storage system 101 configuration. In this embodiment, analogues of processor 132, and memory 134 are included in host computer 118, and each analogue 132, 134 operate in the same manner as described in greater detail above.

The embodiments of the present invention were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A method for configuring operation of a storage controller, said storage controller being coupled to an auxiliary computer, a plurality of storage devices and a host computer to receive read and write requests for said storage devices, said method comprising steps of:

identifying, by the auxiliary computer, characteristics of said storage controller and storage devices;

determining, by the auxiliary computer, configuration options that are compatible with the identified characteristics;

selecting, by the auxiliary computer, one or more computer programs from a multiplicity of computer programs stored in said auxiliary computer to implement the compatible configuration options; and transferring, by the auxiliary computer, the one or more selected computer programs to said storage controller so that said storage controller can execute one or more of the transferred computer programs to implement one of the compatible configuration options.

2. The method of claim 1, further comprising steps of:

creating, after the step of identifying and before the step of determining, one or more subsystems from the plurality of storage devices;

presenting, after the step of determining and before the step of selecting, the compatible configuration options onto a user interface; and, receiving, after the step of presenting, a user selected configuration from the presented configuration options; and wherein the storage controller executes said one or more of the transferred computer programs to implement the user selected configuration.

3. The method of claim 1 further comprising the steps of:

after the transferring step, presenting to a user of said storage controller, the compatible configuration options, and said user selecting one of said compatible configuration options for said storage controller; and after the presenting and user selecting steps, said storage controller executing one or more of the computer programs transferred by the auxiliary computer corresponding to the user selected configuration option.

4. The method of claim 1 wherein the configurations comprise a front end interface, a back end interface, and a plurality of said storage devices.

5. The method of claim 1 wherein said storage controller is a RAID controller.

6. A system for configuring operation of a storage controller for a multiplicity of storage devices, said storage controller being coupled to a host computer to receive read and write requests for said storage devices, said system comprising:

an auxiliary computer coupled to said storage controller, said auxiliary computer including a memory which stores a multiplicity of computer programs to implement storage controller configurations, said auxiliary computer including a computer program to identify characteristics of said storage controller and said storage devices, one or more configuration options that are compatible with said characteristics and one or more of said multiplicity of computer programs which can implement the compatible configuration options, said auxiliary computer including means for transferring the one or more computer programs to said storage controller; and wherein said storage controller includes means for executing one or more of said computer programs transferred from said auxiliary computer to implement one of the compatible configuration options.

7. The system of claim 6 wherein said storage controller further comprises means for presenting said one or more compatible configuration options to a user, receiving a selection from said user of one of said compatible configuration options and using said selection to control the executing means.

8. The system of claim 6 wherein the configurations comprise a front end interface, a back end interface, and a plurality of said storage devices.

9. The system of claim 6 wherein said storage controller is a RAID controller.

10. An auxiliary computer for configuring operation of a storage controller, said storage controller controlling a multiplicity of storage devices and being coupled to a host computer to receive read and write requests for said storage devices, said auxiliary computer comprising:

a processor;

a memory which stores a multiplicity of computer programs to implement storage controller configurations;

a computer program, for execution by said processor, to identify characteristics of said storage controller and said storage devices, storage controller configurations that are compatible with said characteristics, and one or more of said multiplicity of computer programs which can implement the compatible configurations; and means for transferring said one or more computer programs to said storage controller so that said storage controller can execute one or more of the transferred computer programs to implement one of the compatible configurations.

11. The auxiliary computer of claim 10 wherein the configurations comprise a front end interface, a back end interface and a plurality of said storage devices.

12. The auxiliary computer of claim 10 wherein said storage controller is a RAID controller.

13. A computer program product for execution in an auxiliary computer for configuring operation of a storage controller, said storage controller controlling a multiplicity of storage devices and being coupled to a host computer to receive read and write requests for said storage devices, said auxiliary computer including a memory which stores a multiplicity of computer programs to implement storage controller configurations, said computer program product comprising:

a computer readable medium;

first program instructions to identify a plurality of resources associated with said storage controller;

second program instructions to determine storage controller configurations that are compatible with the identified resources and determe one or more of said multiplicity of computer programs which can implement the compatible storage controller configuration; and third program instructions to initiate transfer of said one or more computer programs to said storage controller so that said storage controller can execute one or more of the transferred computer programs to implement one of the compatible configurations; and wherein said first, second and third program instructions are recorded on said medium.

14. A method for configuring the operation of a storage the controller, said storage controller being coupled to an auxiliary computer, a plurality of storage devices and a host computer to receive read and write requests for said storage devices, said method comprising steps of:

identifying, by the auxiliary computer, characteristics of said storage controller and storage devices;

determining, by the auxiliary computer, a configuration that is compatible with the identified characteristics;

selecting, by the auxiliary computer, one or more executable computer programs from a multiplicity of computer programs stored in said auxiliary computer to implement the compatible configuration; and transferring, by the auxiliary computer, the one or more selected computer programs to said storage controller so that said storage controller can execute said one or more selected computer programs to implement said compatible configuration.

15. The method of claim 14 wherein the selected configuration comprises a front end interface, a back end interface, and a plurality of said storage devices.

16. The method of claim 15 wherein said storage controller is a RAID controller.

* * * * *